(12) United States Patent
Schurter (10) Patent No.: US 11,821,490 B2
(45) Date of Patent: Nov. 21, 2023

(54) CONNECTION SYSTEM AND DEVICE FOR CONNECTING A CABLE TO AN ACCESSORY

(71) Applicant: Anibal Schurter, Santa Cruz (CL)

(72) Inventor: Anibal Schurter, Santa Cruz (CL)

(*) Notice: Subject to any disclaimer, the term of this patent is extended or adjusted under 35 U.S.C. 154(b) by 817 days.

(21) Appl. No.: 16/772,677

(22) PCT Filed: Sep. 5, 2017

(86) PCT No.: PCT/CL2017/050048
§ 371 (c)(1),
(2) Date: Jun. 12, 2020

(87) PCT Pub. No.: WO2019/046979
PCT Pub. Date: Mar. 14, 2019

(65) Prior Publication Data
US 2021/0364062 A1    Nov. 25, 2021

(51) Int. Cl.
*F16G 11/00* (2006.01)
*D07B 1/00* (2006.01)
(Continued)

(52) U.S. Cl.
CPC ............. *F16G 11/00* (2013.01); *D07B 1/00* (2013.01); *D07B 1/0673* (2013.01); *D07B 1/144* (2013.01);
(Continued)

(58) Field of Classification Search
CPC ...... Y10T 24/3922; F16G 11/03; F16G 11/00; F16G 15/00; F16B 2200/40
See application file for complete search history.

(56) References Cited

U.S. PATENT DOCUMENTS 2,222,277 A * 11/1940 Baker .................. A01K 91/04
                                                            24/131 R
2,227,420 A *  1/1941 Augenblick ........... A01K 91/04
                                                            43/44.85
(Continued)

FOREIGN PATENT DOCUMENTS

FR    1533987 A    7/1968
GB     990389 A    4/1965
(Continued)

OTHER PUBLICATIONS

ISR for International Application PCT/CL2017 /050048.
(Continued)

*Primary Examiner* — Robert Sandy
*Assistant Examiner* — Michael S Lee
(74) *Attorney, Agent, or Firm* — LADAS & PARRY LLP (57) ABSTRACT

The invention relates to an accessory connector device and to a connection system comprising said device, for connecting and locking at least one accessory to at least one cable, wherein the connector device comprises at least one spiral curved wire whose pitch is between 0.1 and 50 cm, extending and forming an outer envelope and an inner zone surrounded by said outer envelope, wherein the spiral curved wire pitch defines spiral sections, so that the connector device comprises between 1 to 1000 spiral sections along its extension, wherein the inner zone of the connector device comprises a spiral axis, so that the outer envelope formed by the spiral curved wire surrounds said spiral axis, wherein said inner area is configured to receive a first cable arranged along the spiral axis, and wherein at least one of the spiral sections of the spiral curved wire is configured to connect the connector device with the accessory in said at least one spiral section, locking the lateral sliding of the accessory with respect to the spiral axis, so that at least part (Continued)

of the accessory is located between the first cable and the spiral curved wire.

19 Claims, 8 Drawing Sheets

(51) Int. Cl.
  *D07B 1/06*  (2006.01)
  *D07B 1/14*  (2006.01)
  *E04H 17/04*  (2006.01)
  *F16B 15/00*  (2006.01)
  *E04H 17/10*  (2006.01)

(52) U.S. Cl.
  CPC ............ *E04H 17/04* (2013.01); *F16B 15/00* (2013.01); *D07B 2201/102* (2013.01); *D07B 2201/1004* (2013.01); *D07B 2201/2086* (2013.01); *D07B 2501/2038* (2013.01); *E04H 17/10* (2013.01); *F16B 2200/40* (2018.08)

(56) References Cited

U.S. PATENT DOCUMENTS

| | | | | |
|---|---|---|---|---|
| 3,080,631 A | * | 3/1963 | Ruhlman | ............... H02G 7/10 |
| | | | | 174/79 |
| 3,288,918 A | * | 11/1966 | Schlein | ............... H01B 17/22 |
| | | | | 24/546 |
| 3,664,010 A | * | 5/1972 | D'Agati | ............... H01B 17/22 |
| | | | | 174/79 |

FOREIGN PATENT DOCUMENTS

| | | |
|---|---|---|
| GB | 1061271 A | 3/1967 |
| GB | 1103338 A | 2/1968 |
| GB | 1135432 A | 12/1968 |

OTHER PUBLICATIONS

Written Opinion for International Application PCT/CL2017/050048.
FR1533987 A _ English Translation.

* cited by examiner

CONNECTION SYSTEM AND DEVICE FOR CONNECTING A CABLE TO AN ACCESSORY

RELATED APPLICATION

This application is an application under 35 U.S.C. 371 of International Application No. PCT/CL2017/050048 filed on 5 Sep. 2017, the entire contents of which are incorporated herein by reference.

The present invention relates to a connection system and a connector device between a cable and an accessory for joining and locking at least one accessory to at least a first cable, so that the lateral sliding of the accessory with respect to the cable is blocked.

The present invention allows at least one accessory to be locked to a first cable facilitating the connection between a cable and an accessory that is required in multiple applications where structures with one or more cables are used, such as in the agricultural industry with respect to wired structures designed to arrange ceilings on plantations. Notwithstanding this, the invention can be applied to any type of wired structure that requires connection with an accessory.

The terms "cable", "wire" or "line" are used interchangeably in the present description to refer to all those wired structures that have cables or wires connecting one point to another of said structure.

BACKGROUND OF THE INVENTION

There are various systems and devices for locking the crossover between a cable and an accessory particularly between a first cable or wire and another second cable or wire. Most of these systems and devices are aimed at facilitating their installation and effectively locking the slippage of an accessory, for example a cable or wire, with respect to a reference cable. For example, one of the most used connectors for crossing cables is the pin type, which comprises a first part with an opening that has perpendicular gutters one deeper than the other configured to receive the cables that are crossed, wherein a second gutter of the connector is configured to close the opening of the first part, keeping the cables that are crossed together and allowing the longitudinal sliding of each of them which is useful for tension maneuvers. Although this type of connector is useful to keep cable crossings together, it has the disadvantage that its installation is slow, requiring the coupling of two separate components together, which can be time consuming in applications where there are multiple cable crossings, for example, in the lines or cables that cross over plantations with structures for the arrangement of roofs and/or meshes in different directions. In addition, this type of connectors while keeping the crossing between cables together does not prevent lateral sliding of one of the cables over the other, making it difficult the installation in structures with multiple crossings between cables.

Other similar types of connectors, but which allow the connection to be fixed in at least one of the cable directions, are complex to install considerably increasing installation times and therefore, are of little use in applications with structures that have multiple crossings between a cable and an accessory or between cables. Among the main limitations of other alternatives is the cost of the installation or its malfunction. In this sense, the most similar technology used in practice corresponds to a soft wire that is wound to each side of the crossover between cables or between a cable and an accessory being such a low-cost solution since it requires only a piece of wire and a simple tool, this solution is commonly known as "guatana". However, this solution requires considerable time in its installation because it requires multiple manually turns in each opposite direction to the crossing. Another disadvantage of this solution is that as the wire used is not rugged, when applying extreme lateral forces the wire moves on the cable in which it is installed. Another problem derived from said solution is that the turns of the soft wire define sections of wire that are arranged very close to each other, which stiffens the section of the wrapped wire generating fatigue and rupture of material at the end of the turns (spirals).

In view of the foregoing, it is necessary to have a connection system and a connector device that solve the problems existing in the prior art particularly regarding the ease of installation of the connector devices in structures that require multiple connections between a cable and an accessory, for example, between two or more cables or between a cable and a post, allowing to lock the lateral sliding of at least one accessory with respect to the cable.

DESCRIPTION OF THE INVENTION

One of the objects of the present invention is to provide a connection system between a cable and an accessory and an accessory connector device for connecting and locking at least one accessory to at least one cable.

Another object of the present invention is to provide a connection system between a cable and an accessory and an accessory connector device that allow the lateral sliding of an accessory with respect to a cable to be locked.

Another objective of the present invention is to lock the lateral sliding of a cable as an accessory with respect to another cable while allowing the longitudinal sliding of the locked cable.

Another object of the present invention is to facilitate the installation of the connection system and connector devices in structures with multiple connections between cables and accessories, allowing to reduce installation times and complexities.

The foregoing objectives are achieved by a connection system between a cable and an accessory and by an accessory connector device both for attaching and locking at least one accessory to at least a first cable.

The connection system between a cable and an accessory comprises at least one accessory connector device formed by at least one spiral curved wire whose pitch is between 0.1 and 50 cm, said spiral curved wire extends forming an outer envelope and an inner zone surrounded by said outer envelope. The pitch of the curved spiral wire defines spiral sections so that the connector device comprises between 1 to 1000 spiral sections along its length. The inner zone of the connector device is configured to receive a first cable inside the spiral curved wire so that the outer envelope formed by the spiral curved wire surrounds said first cable perimeter. In view of the above, at least one accessory can be connected to said first cable housed in the spiral curved wire through at least one of the spiral sections of said wire, the connector device interacting with the accessory in said at least one spiral section so that at least part of the accessory is located between the first cable and the spiral curved wire of the connector device blocking the lateral sliding of the accessory with respect to the first cable.

On the other hand, the accessory connector device comprises at least one spiral curved wire whose pitch is between 0.1 and 50 cm wherein said wire extends forming an outer envelope and an inner zone surrounded by said outer envelope. The pitch of the curved spiral wire defines spiral sections so that the connector device comprises between 1 to 1000 spiral sections along its length. The inner zone of the connector device comprises a spiral axis which passes through the center of the inner zone in a longitudinal direction, where the inner zone is configured to receive a first cable along the spiral axis wherein said first cable is housed inside the spiral curved wire so that the outer envelope formed by said wire surrounds said spiral axis and therefore, the first cable. In view of the foregoing, at least one accessory may be connected to said first cable through at least one of the spiral sections of the spiral curved wire, the connector device interacting with the accessory in said at least one spiral section such that at least part of the accessory is located between the first cable and the spiral curved wire blocking the lateral sliding of the accessory with respect to the spiral axis and therefore, to the first cable.

Additionally, one embodiment of the connection system and connector device also comprises two or more spiral curved wires arranged adjacent to one another forming an outer envelope surface. In particular, a preferred embodiment of the invention comprises three spiral curved wires side by side, defining an outer envelope surface given by the plane tangential to said three wires.

Furthermore, according to an embodiment of the invention the outer envelope of the spiral curved wire has an internal face configured to contact the first cable, said internal face facing the spiral axis wherein said internal face comprises a surface layer which increases the friction between the connector device and the first cable avoiding the relative sliding between the connector device and said first cable. According to another similar embodiment, the outer envelope has an outer face wherein said outer face also comprises a surface layer. The surface layers of the inner and/or outer faces of the spiral curved wire are formed by any material that increases the friction between the first cable and the spiral wire and/or that prevents longitudinal displacement of the first cable housed in said spiral curved wire. According to one embodiment, the surface layer is formed by one or more of the group comprised of a rugged surface finish, a granular material, an adhesive material, a non-slip material. According to one embodiment, the rugged surface finish comprises roughness values greater than 50 Ra, preferably between 100 Ra to 1000 Ra. According to one embodiment, the granulated material comprises particles greater than 50 microns, preferably between 100 to 1000 microns. According to one embodiment, the adhesive material is an adhesive of synthetic origin, such as an elastomer, or an adhesive of natural origin, such as a natural resin. And, according to one embodiment, the non-slip material is formed by elastomers, thermostable polymers and/or thermoplastic polymers.

On the other hand, according to an embodiment of the invention, the pitch of the spiral curved wire is between 1 to 10 cm, preferably 4.5 cm. Furthermore, according to an embodiment of the invention the connector device comprises between 5 and 10 spiral sections in their entire extension.

According to an embodiment of the invention, the spiral curved wire is made of a ductile material wherein according to another embodiment the connector device can also be resistant to plastic deformation. According to one embodiment, the tensile strength of the connector device is between 100 to 1000 MPa.

According to a first preferred embodiment of the invention, the accessory connecting to the first cable is a second cable that crosses the first cable wherein the second cable connects to said first cable through at least one of the spiral sections of the spiral curved wire, the connector device interacting with the second cable in said at least one spiral section such that at least part of the second cable is located between the first cable and the spiral curved wire of the connector device.

According to a second preferred embodiment of the invention the accessory is a pole that crosses said first cable wherein the spiral curved wire has a central section and two ends wherein the central section is separated from the spiral axis that connects the two ends, said central section is adapted to receive said pole through said central section, the connector device interacting with the pole that crosses said first cable through said central section so that the pole is located between the first cable and the spiral curved wire, the first cable connecting to the pole. According to this second embodiment, the central section may consist of a zone where the spiral curved wire extends forming at least a semi-circle portion, the radius of which is between 1 to 50 cm, wherein said semi-circle portion is such that adapts to the perimeter of the pole.

According to an alternative embodiment of the invention, the connection system between a cable and an accessory comprises two or more connector devices for connecting and locking two or more accessories to one or more cables. Furthermore, according to another embodiment two or more accessories can be connected in each spiral section of the spiral curved wire, taking advantage of each spiral section to connect and lock each accessory to the cable.

BRIEF DESCRIPTION OF THE FIGURES

As part of the present application, the following representative figures of the invention are presented, which teach preferred embodiments thereof and therefore, should not be considered as limiting the definition of the subject matter claimed by the present application.

FIG. 9 shows a representative diagram of the connection system application of the present invention.

DETAILED DESCRIPTION OF THE PREFERRED EMBODIMENTS

Figure 1:
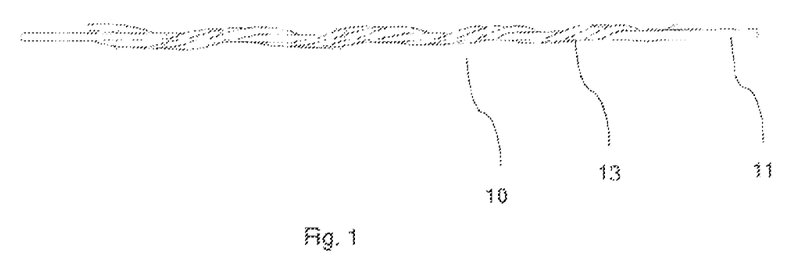
FIG. 1 shows a representative diagram of the connector device of the invention according to a preferred embodiment formed by three spiral curved wires.

FIG. 1 shows the accessory connector device 10 according to an embodiment of the invention, formed by three spiral curved wires arranged adjacent to each other. The spiral curved wires form spiral sections 13 given by the turns of the spiral. Furthermore, it can be seen that the spiral curved wires form an outer envelope that surrounds an inner zone 14, said inner zone is arranged to receive a cable inside the connector device 10.

Figure 2:
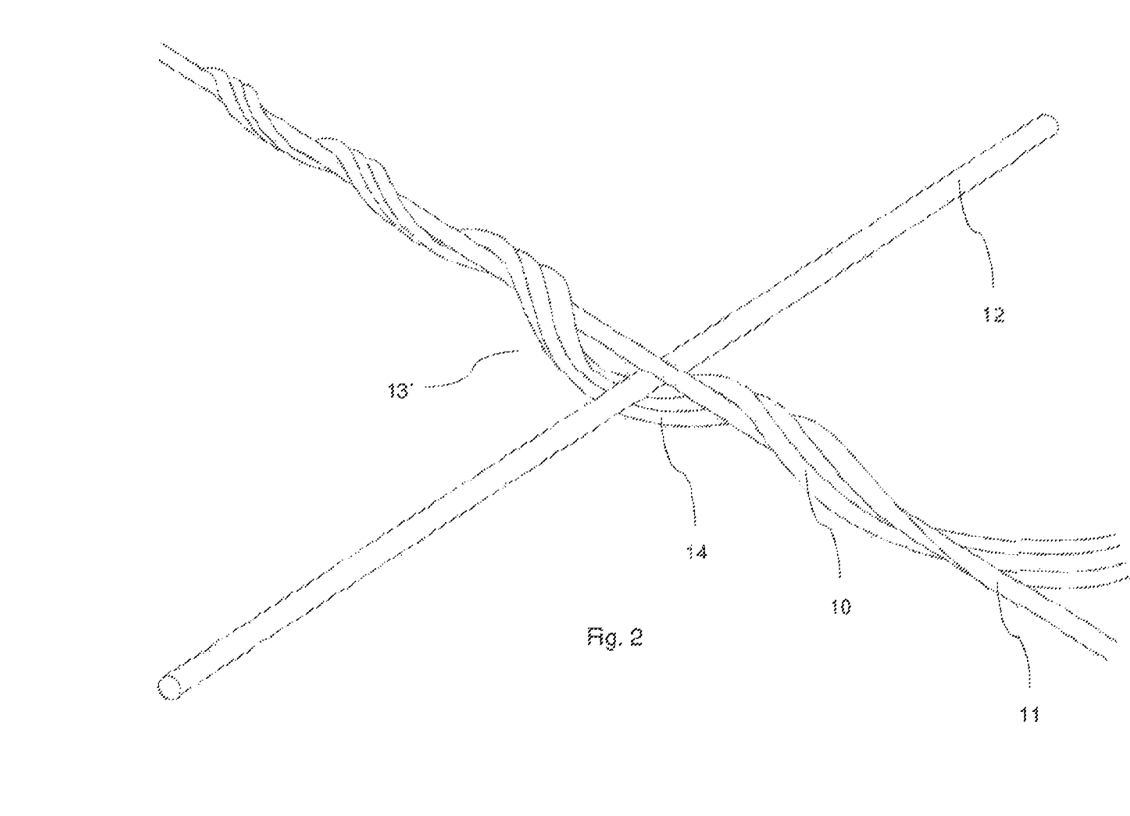
FIG. 2 shows a representative diagram of the connection system using the connector device of FIG. 1 connecting a first cable with a second cable.
Figure 3:
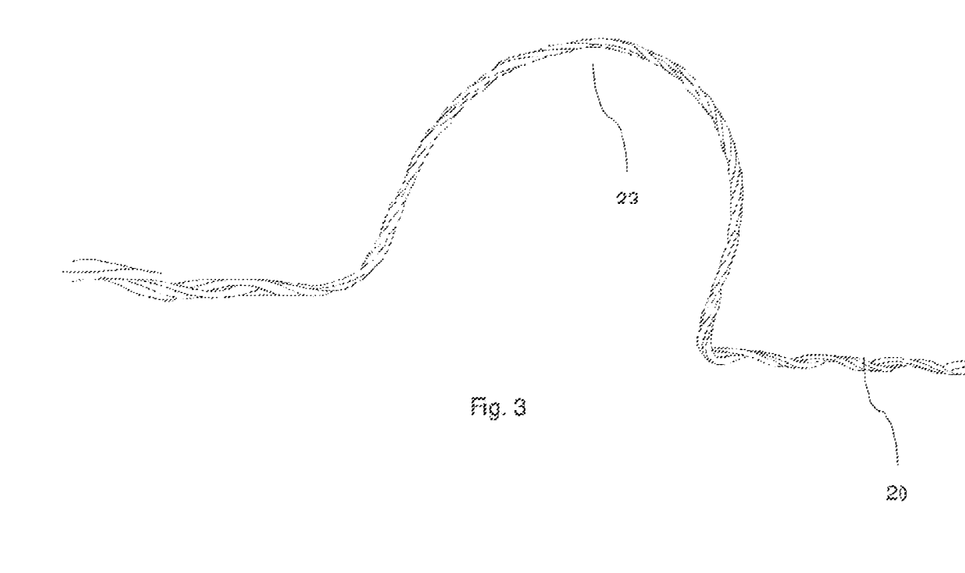
FIG. 3 shows a representative diagram of the connection system of FIG. 2 showing the connection of the first cable with the second cable.

FIG. 2 shows the connector device 10 installed in a first cable 11 wherein said first cable 11 is housed in the inner zone 14 so that the outer envelope formed by the spiral curved wire surrounds said first cable 11 perimeter. Furthermore, FIG. 2 shows the connection between the first cable 11 and a second cable 12 as an accessory so that said second cable 12 passes between the first cable 11 and the connector device 10, particularly in a spiral section 13'. FIG. 3 shows a representative diagram of the connection between the first cable 11 and the second cable 12 wherein the second cable 12 is housed in a space that is generated in the spiral section 13', space that limits the lateral movement of the second cable 12 with respect to the first cable 11. Furthermore, in FIG. 3 it can be seen that the cable 12 is not locked in its longitudinal direction being possible to carry out longitudinal movements of said second cable 12 without affecting the connection by means of the connector device 10, for example, in tensioning operations of the second cable 12.

Figure 4:
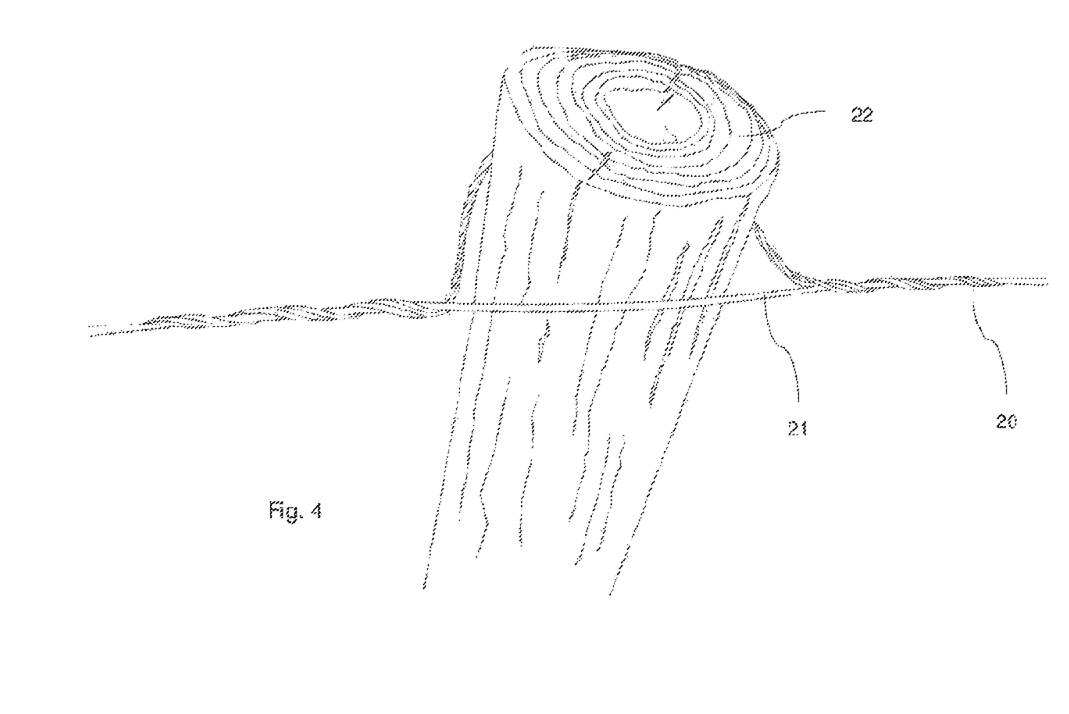
FIG. 4 shows a representative diagram of the connector device of the invention according to another preferred embodiment, formed by three spiral curved wires and a central section that forms at least a semi-circle portion.
Figure 5:
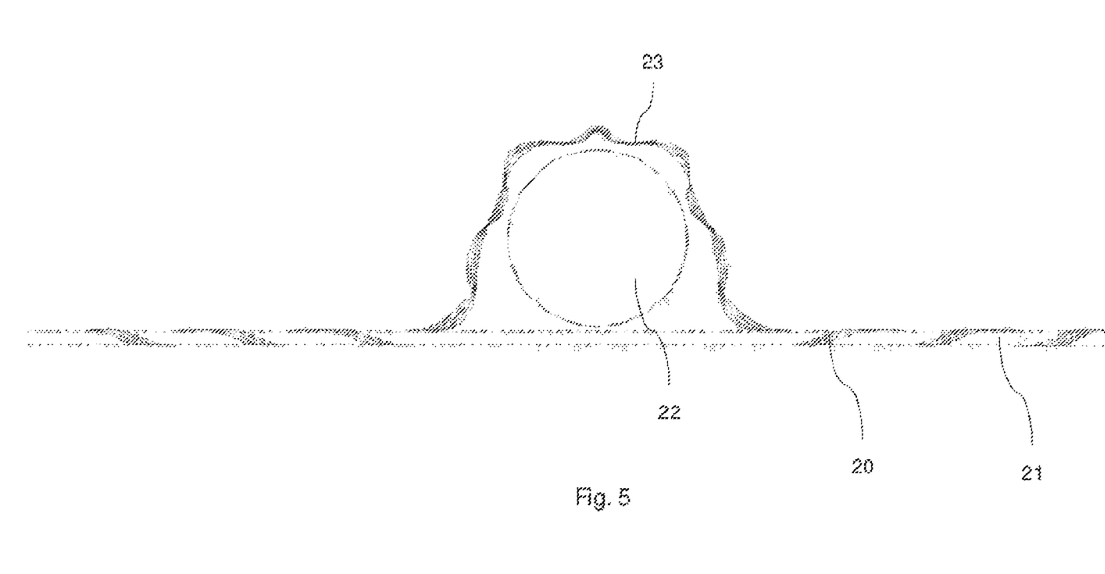
FIG. 5 shows a representative diagram of the connection system using the connector device of FIG. 4 connecting a cable with a pole.
Figure 6:
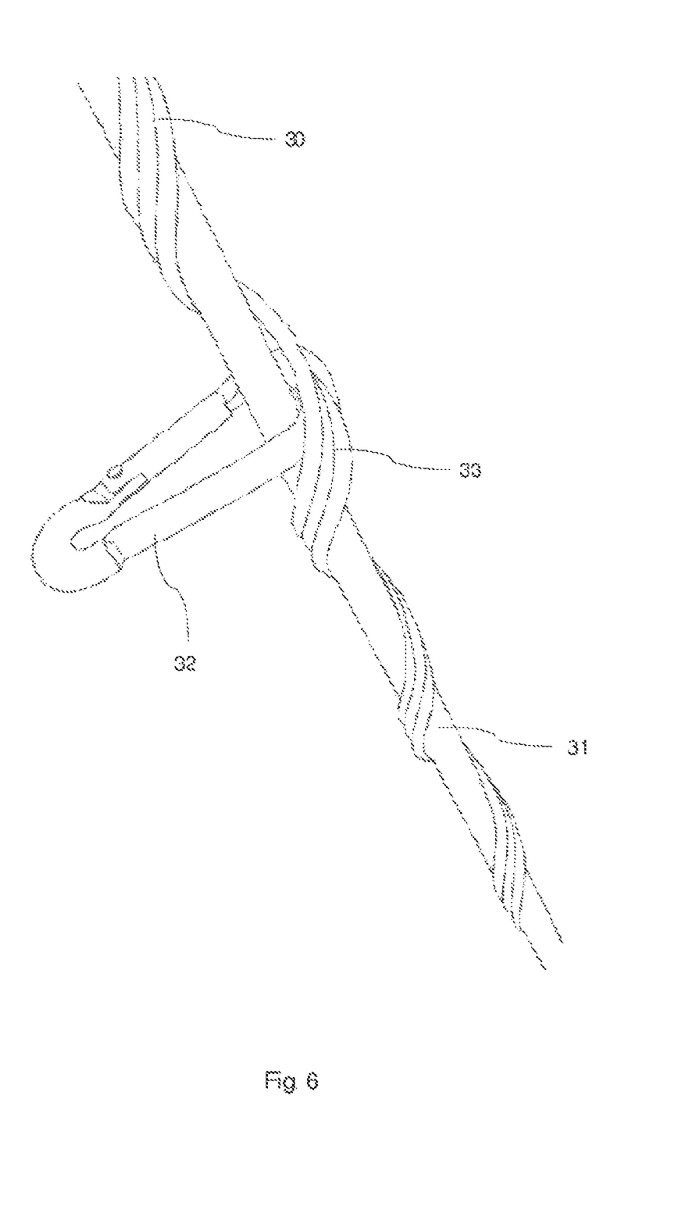
FIG. 6 shows a representative diagram of the connection system of FIG. 5 showing the connection of the cable with the pole.

A representative diagram of the connector device 20 of the invention according to another preferred embodiment is shown in FIG. 4, consisting of three spiral curved wires and a central section 23 that forms at least a semi-circle portion. Said central section 23 is arranged to house a pole 22 acting as an accessory according to the present embodiment. In fact, in FIG. 5 it can be seen that the connector device 20 is installed in a first cable 21 wherein the pole 22 is connected to said first cable 21 passing between the connector device 20 and the first cable 21 blocking the lateral sliding of the pole in relation to the first cable. In this embodiment, the pole 22 acts as the accessory or the first cable 12 of FIGS. 2 and 3 wherein the central section 23 has the appropriate size and configuration to house said pole 22 so that it is arranged between the connector device 20 and the first cable 21. FIG. 6 shows in greater detail the type of connection between the pole 22 and the first cable 21 wherein the first cable is housed in the inner zone of the connector device 20 and where the center section of the connector device 20 is configured to surround the perimeter of the pole. In this regard, the perimeter of the pole can be square, circular, oval, or any other geometric shape that can be replicated by the central section 23 of the connector device 20, in order to ensure the correct connection between the pole 22 and the cable 21.

Figure 7:
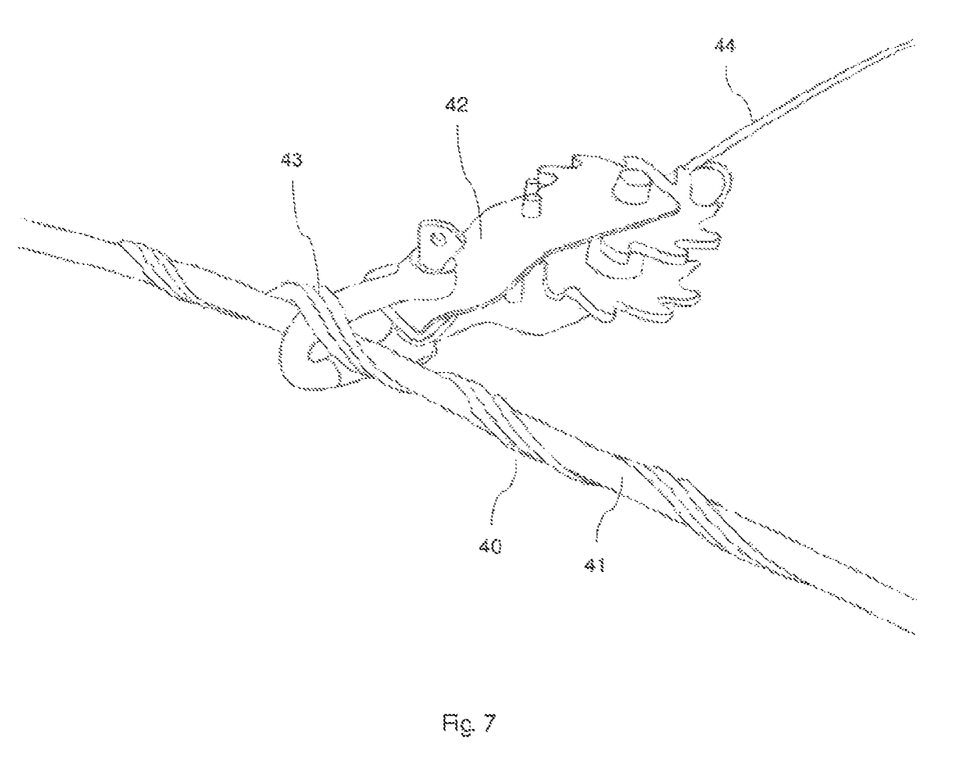
FIG. 7 shows a representative diagram of the connection system of the invention according to an alternative embodiment wherein the accessory is a karabiner.
Figure 8:
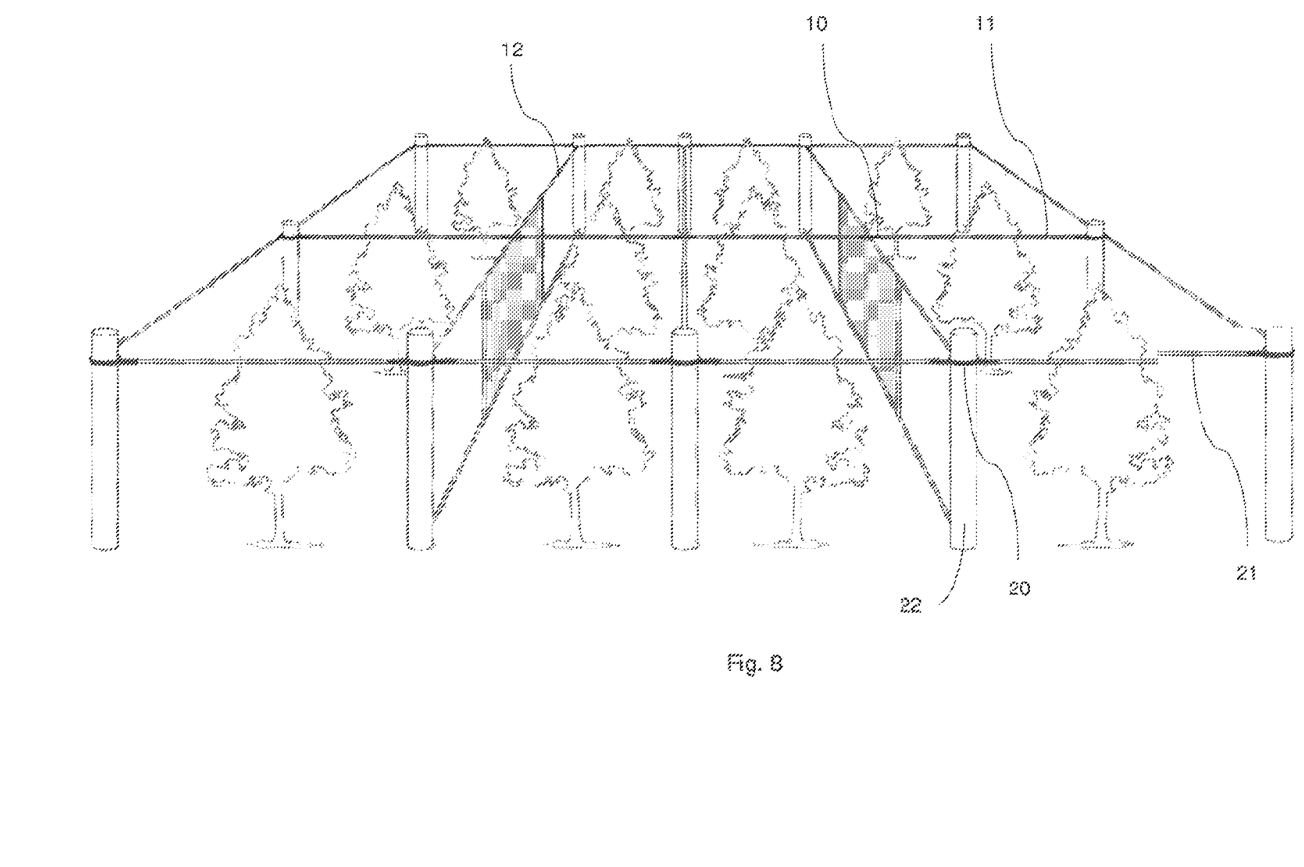
FIG. 8 shows a representative diagram of the connection system of the invention according to an alternative embodiment wherein the accessory is a cable tensor.

FIG. 7 shows an alternative embodiment of the invention wherein the connector device 30 is installed in a first cable 31, said first cable is housed in the inner zone of the connector device 30 wherein an accessory 32 in the form of a karabiner can be installed in a spiral section 33 of the connector device 30, so that the sliding of said accessory 32 over the length of the first cable 31 is locked by the connector device 30. Similarly, FIG. 8 shows another alternative embodiment of the invention wherein an accessory 42 in the form of a cable tensor is installed in a cable 41 that is housed by a connector device 40 wherein said accessory 42 is located between cable 41 and the connector device 40, so that the sliding of the accessory 42 on the cable 41 is prevented by the action of the connector device 40 particularly by the spiral section 43 of said connector device.

FIG. 9 shows a representative diagram of an industrial application of the connection system and connector device of the present invention in a structure 50 on an orchard wherein a series of poles 22 support cable sets 11, 12 and 21, so that the connector device 10 is installed at multiple crossings between a first cable 11 and a second cable 12, and the connector device 20 is used to connect crossings between cables 21 and poles 22. The structure 50 can be used to arrange curtain type structures 51 or other elements requiring support by cables.

Finally, it is important to note that for the purposes of the present invention the term "accessory" refers to any element that needs to be easily connected to a cable, so that the movement of said accessory is fixed or locked in the longitudinal direction of the cable. In this sense, the accessory can be a second cable that must be fixed to the first, a pole connecting the first cable or any other type of element that can be connected to a cable, for example a karabiner or a cable tensor.

The invention claimed is:

1. An accessory connector device for connecting and locking at least one accessory to a cable, so that lateral sliding of the accessory relative to the cable is prevented, but longitudinal sliding of the accessory is allowed, the accessory connector device comprising
    at least one spiral curved wire whose pitch is between 0.1 and 50 cm, extending and forming an outer envelope and an inner zone surrounded by said outer envelope,
    wherein the spiral curved wire pitch defines spiral sections, so that the connector device comprises between 1 to 1000 spiral sections along its length,
    wherein the inner zone of the connector device comprises a spiral axis, such that the outer envelope formed by the spiral curved wire surrounds said spiral axis wherein said inner zone is configured to receive a first cable arranged along the spiral axis,
    wherein at least one of the spiral sections of the spiral curved wire is configured to connect the connector device with the at least one accessory in said at least one spiral section, the lateral sliding of the at least one accessory being locked with respect to the spiral axis, so that at least part of the at least one accessory is located between the first cable and the spiral curved wire, and
    wherein the at least one accessory is at least a second cable or pole such that:
    when the at least one accessory is a second cable, at least one of the spiral sections of the spiral curved wire is configured to connect the connector device with the second cable in said at least one spiral section, such that at least part of the second cable is located between the first cable and the spiral curved wire of the connector device, locking the lateral sliding of the second cable with respect to the spiral axis and allowing the sliding of the second cable in its longitudinal direction; and
    when the at least one accessory is a pole, the spiral curved wire has a central section and two ends, wherein the central section is separated from the spiral axis that joins the two ends, said central section adapted to receive a pole through the connector device, the connector device interacting with the pole and with the first cable through said central section so that the pole is located between the first cable and the spiral curved wire, the first cable connecting with the pole, locking the lateral sliding of the pole with respect to the spiral axis and allowing the sliding of the pole in its longitudinal direction.

2. The connector device according to claim 1, wherein it comprises two or more spiral curved wires arranged adjacent to each other forming an outer envelope surface given by a plane tangential to said two or more spiral curved wires.

3. The connector device according to claim 1, wherein the outer envelope has an internal face facing the spiral axis wherein said internal face has a surface layer that increases the friction between the connector device and the first cable avoiding the relative slippage between the connector device and said first cable.

4. The connector device according to claim 3, wherein the outer envelope has an external face wherein said external face also comprises a surface layer.

5. The connector device according claim 3, wherein the surface layer is formed by one or more from the group comprised of a rugged surface finish, a granular material, an adhesive material, a non-slip material.

6. The connector device according to claim 5, wherein the rugged surface finish comprises roughness values greater than 50 Ra.

7. The connector device according to claim 6, wherein the rugged surface finish comprises roughness values between 100 Ra to 1000 Ra.

8. The connector device according to claim 5, wherein the granulated material comprises particles greater than 50 microns.

9. The connector device according to claim 8, wherein the granulated material comprises particles between 100 to 1000 microns.

10. The connector device according to claim 5, wherein the adhesive material is an adhesive of synthetic origin such as an elastomer, or an adhesive of natural origin such as a natural resin.

11. The connector device according to claim 5, wherein the non-slip material is formed by elastomers, thermostable polymers and/or thermoplastic polymers.

12. The connector device according claim 1, wherein the pitch of the spiral curved wire is between 1 to 10 cm.

13. The connector device according claim 12, wherein the pitch of the spiral curved wire is 4.5 cm.

14. The connector device according to claim 1, wherein it comprises between 5 and 10 sections of wire throughout its extension.

15. The connector device according to claim 1, wherein its tensile strength is between 100 to 1000 MPa.

16. The connector device according to claim 1, wherein the central section consists of an area wherein the spiral curved wire extends forming at least a semi-circle portion wherein said semi-circle portion comprises a radius between 1 to 50 CM.

17. A connection system between a cable and an accessory for connecting and locking at least one accessory to at least one cable, so that lateral sliding of the accessory relative to the cable is prevented, but longitudinal sliding of the accessory is allowed, wherein it comprises at least one accessory connector device according to any one of the preceding claims, a first cable and at least one accessory, wherein the inner area of the at least one connector device is configured to receive the first cable, so that the outer envelope formed by the spiral curved wire surrounds said first cable perimeter, and wherein the at least one accessory is connected with said first cable through at least one of the spiral sections of the spiral curved wire of the at least one accessory connector device, said at least one accessory connector device interacting with the accessory in said at least one spiral section of the at least one accessory connector device, so that at least part of the accessory is located between the first cable and the spiral curved wire of the at least one accessory connector device locking the lateral sliding of the accessory with respect to the first cable;

wherein the at least one accessory is at least a second cable or pole such that:

when the at least one accessory is a second cable, at least one of the spiral sections of the spiral curved wire is configured to connect the connector device with the second cable in said at least one spiral section, such that at least part of the second cable is located between the first cable and the spiral curved wire of the connector device, locking the lateral sliding of the second cable with respect to the spiral axis and allowing the sliding of the second cable in its longitudinal direction; and when the at least one accessory is a pole, the spiral curved wire has a central section and two ends, wherein the central section is separated from the spiral axis that joins the two ends, said central section adapted to receive a pole through the connector device, the connector device interacting with the pole and with the first cable through said central section so that the pole is located between the first cable and the spiral curved wire, the first cable connecting with the pole, locking the lateral sliding of the pole with respect to the spiral axis and allowing the sliding of the pole in its longitudinal direction.

18. The connection system according to claim 17, wherein the central section consists of an area wherein the spiral curved wire extends forming at least a semi-circle portion wherein said semi-circle portion is such that it adapts to the pole perimeter comprising a radius between 1 to 50 cm.

19. The connection system according to claim 17, wherein it comprises two or more connector devices for connecting and locking two or more accessories to one or more cables.

* * * * *